Jan. 16, 1940.  J. P. GOGGINS  2,187,397
AIR CONDITIONING APPARATUS
Filed Sept. 7, 1937   3 Sheets—Sheet 1

INVENTOR
James P. Goggins
BY
ATTORNEY

Jan. 16, 1940.  J. P. GOGGINS  2,187,397
AIR CONDITIONING APPARATUS
Filed Sept. 7, 1937  3 Sheets-Sheet 2

INVENTOR
James P. Goggins
BY Thos. E. Scofield
ATTORNEY

Jan. 16, 1940. J. P. GOGGINS 2,187,397
AIR CONDITIONING APPARATUS
Filed Sept. 7, 1937 3 Sheets-Sheet 3
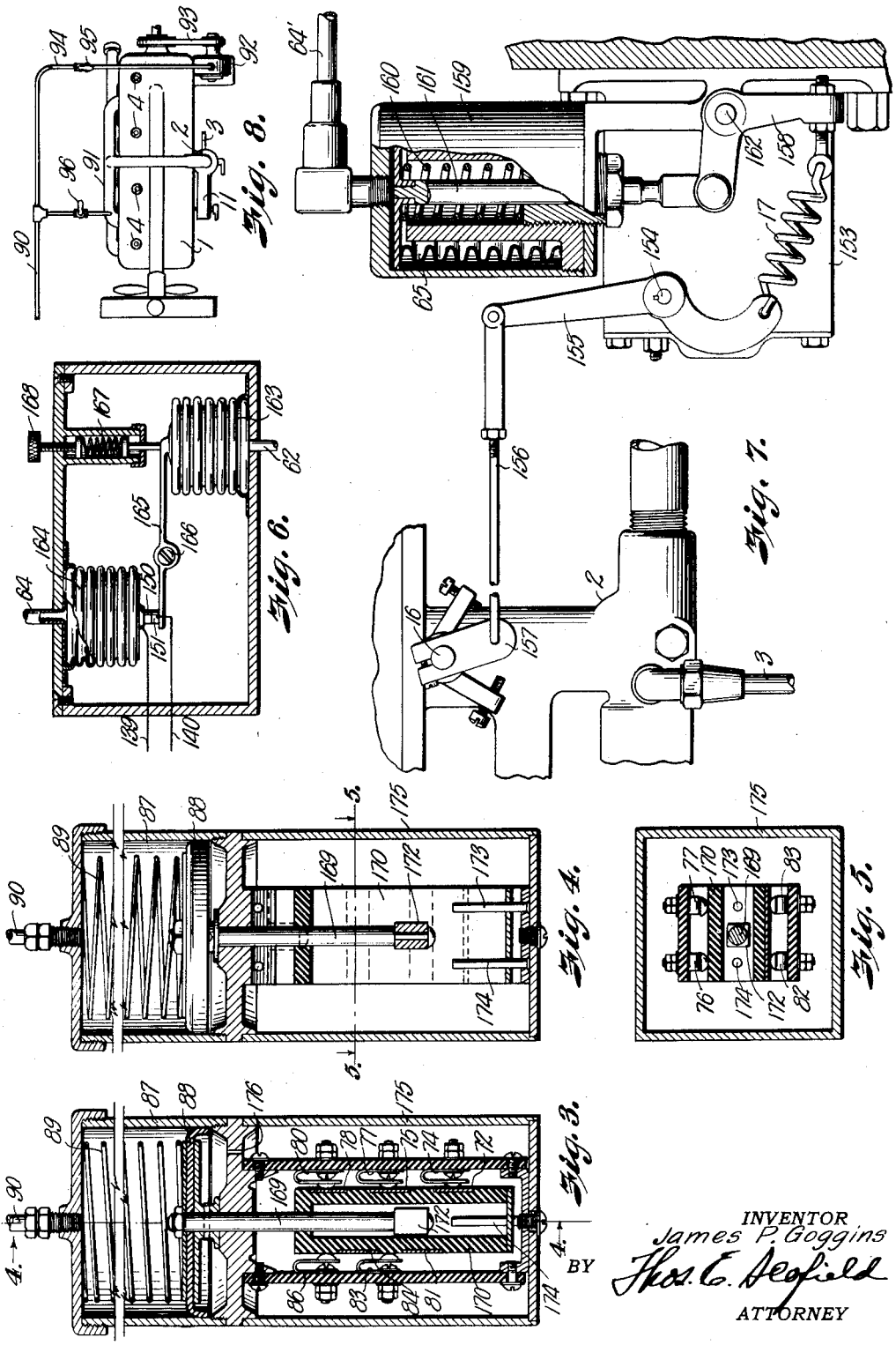
INVENTOR
James P. Goggins
BY
Thos. E. Scofield
ATTORNEY Patented Jan. 16, 1940

2,187,397

UNITED STATES PATENT OFFICE 2,187,397

AIR CONDITIONING APPARATUS

James P. Goggins, Omaha, Nebr., assignor to Interstate Transit Lines, Omaha, Nebr., a corporation of Nebraska Application September 7, 1937, Serial No. 162,601

7 Claims. (Cl. 62—6)

My invention relates to air conditioning apparatus and more particularly to an air conditioning assembly actuated automatically by an internal combustion engine, the arrangement being of such flexibility and compactness that it is especially adapted for use in the air conditioning of passenger vehicles such as automobile omnibuses, other automobile vehicles, ships, airplanes and the like, as well as private dwellings, hotels, and office buildings.

Currently, air conditioning is being widely used but it remains costly to operate due to the necessity of employing expensive electric power. In vehicles, electric power is not available and a natural and convenient source of power is an internal combustion engine which is highly developed. One of the major requirements of an air conditioning system is that it maintains a constant temperature automatically in response to a thermostat. The difficulty of starting and stopping an internal combustion engine adapted to operate the compressor of a refrigerating system of the air conditioning assembly has been such that those systems which employed an internal combustion system as power resorted to a constantly running engine adapted to be clutched and unclutched from the load. The use of a clutch has been found very unsatisfactory. The clutch rapidly wears and the necessity of constantly running the internal combustion engine made the operation inefficient.

In modern motor transport, such as an automobile omnibus, the problem is extremely difficult. Various state laws exist, limiting the highway axle weights. Any air conditioning system which can be used upon a motor bus must therefore be light in weight. The space on a motor bus is limited, there being about 1200 cubic feet available in all, to take an illustrative example. Of this space, 700 cubic feet are occupied by the passengers. Inasmuch as the passenger space is usually fairly well filled with human beings, it is necessary, to insure that a comfortable temperature be maintained, to circulate about 600 cubic feet of air per minute. This air cannot be constantly recirculated as it will soon become foul. It has been found that about 200 cubic feet of fresh air per minute must be taken in and the same amount discharged from the body of circulating air in order to maintain the health and comfort of the passengers. It has been found that the air conditioning assembly, in addition to being light and compact, must be capable of producing the equivalent of between four and five tons of refrigeration.

One object of my invention is to provide an air conditioning assembly which is powered by an internal combustion engine in which the engine operates only when required.

Another object of my invention is to provide an air conditioning assembly powered by an internal combustion engine, which is entirely automatic, the arrangement being such that the engine is started and stopped in response to the requirements of the air space being conditioned.

Another object of my invention is to provide an air conditioning assembly of such compactness and flexibility that it may be employed to air condition an automobile omnibus.

Another object of my invention is to provide an air conditioning assembly powered by an internal combustion engine in which a clutch with its attendant disadvantages is eliminated.

Other and further objects of my invention will appear from the following description.

In the accompanying drawings which form part of the instant specification and are to be read in conjunction therewith and in which like reference numerals are used to indicate like parts in the various views;

Figure 3 is a sectional elevation of a control element forming part of my assembly.

Figure 4 is a sectional view taken along the line 4—4 of Figure 3.

Figure 5 is a sectional view taken along the line 5—5 of Figure 4.

Figure 6 is a sectional view of the high-low control forming a part of my assembly.

Figure 7 is a fragmentary view on an enlarged scale, with parts in section, of another control element forming part of my air conditioning assembly.

Figure 8 is a fragmentary view of a detail of my assembly.

Figure 1:
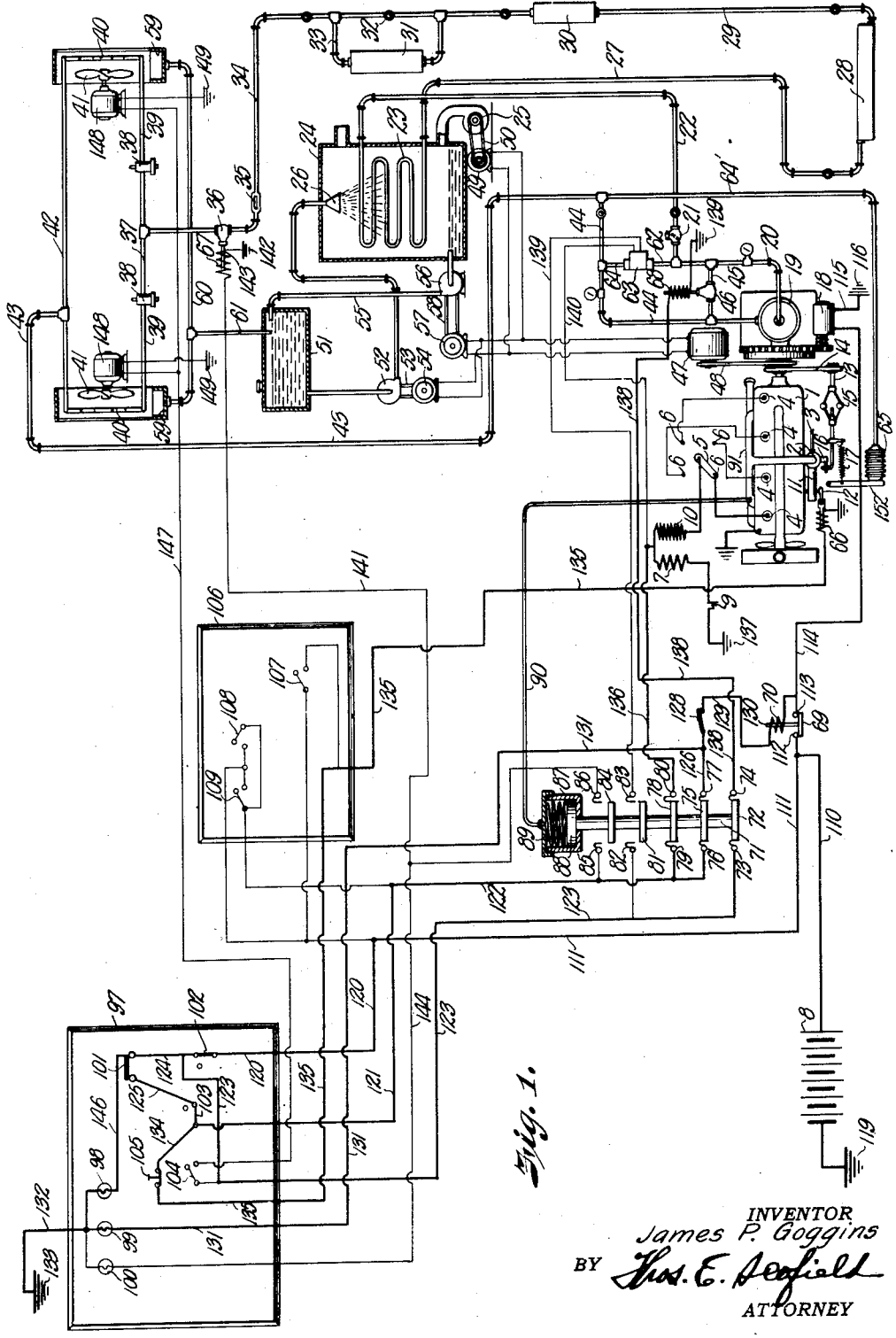
Figure 1 is a diagrammatic view of an air conditioning assembly showing one embodiment of my invention, with the parts in the starting position, the electric conductors carrying current being shown in heavy lines.

In general, my invention contemplates the provision of a commutator or control switch, actuated in response to the operation of an internal combustion engine whereby a thermostat will close proper circuits through the commutator to start the internal combustion engine, and when the engine has been started, will permit it to run until the air conditioning requirements of the space being conditioned have been satisfied, at which time the internal combustion engine will be caused to stop. Provision is made to unload the compressor as soon as it stops so that the engine may start under substantially no load, the arrangement being such that when the engine is running, the unloading device is automatically operated to permit the compressor to function.

More particularly, referring now to the drawings, an internal combustion engine 1 is provided with the usual carburetor 2, to which fuel is fed through a fuel line 3. The internal combustion engine has spark plugs 4, furnished voltage through the usual distributor arm 5, moving in timed relation with contact points 6. Potential is supplied to the primary 7 of an induction coil from a battery 8, which in the case of an automotive vehicle, may be the vehicle battery. A customary interrupter 9 is provided to make and break circuit through the primary 7, whereby an electromotive force will be induced in the secondary 10 of the induction coil for distribution to the spark plugs 4 of the engine 1. The air intake to the carburetor is shown at 11 and is provided with a choke 12. The engine drives a governor shaft 13 through any suitable connection such as belt 14. The governor 15 tends to close the throttle 16 against the action of spring 17. The engine 1 is adapted to be started by an electric starting motor 18, as is well known to the art. The engine 1 actuates the compressor 19 of the refrigeration system of the assembly. The compressed refrigerant, when the system is in operation, leaves the compressor through line 20, passes through check valve 21, line 22, through condenser coil 23, which is positioned in a casing 24, through which air is adapted to be blown by blower 25. Water is sprayed over the condenser 23 from any suitable means such as a spray head 26. The condensed refrigerant fluid leaves the condenser through line 27 and passes into a liquid reservoir 28, whence it leaves through line 29, passing through a strainer 30, and thence through a dryer 31, it being understood dryer by-pass valve 32 is normally closed. The refrigerant fluid leaves the dryer through line 33 and passes through line 34, through a sight feed glass 35, through a magnetically controlled valve 36 into the manifold 37. The compressed, condensed refrigerant fluid passes through thermostatic expansion valves 38, through lines 39, through refrigerating coils 40, over which the air to be conditioned is passed by fans 41. The refrigerant fluid leaves the refrigerating coils 40 and passes into the manifold 42, whence it leaves through line 43 and passes to the compressor suction pipe line 44. It will be noted that the compressor discharge line 20 and the compressor suction line 44 are provided with an intercommunicating line 45. controlled by a solenoid operated valve 46. The valve 46 is an unloader valve, permitting the suction side of the compressor and the discharge side of the compressor to communicate and thus relieve any load upon the compressor. The valve 46, during operation, is normally closed. The engine 1 drives a generator 47 through any suitable means such as a belt 48, the output of the generator being used to actuate motor 49, which drives the blower 25 through a belt 50.

Water for passage over the condenser 23 is supplied from a water supply tank 51 by pump 52 which is driven through any suitable means such as a belt 53, by motor 54, current being supplied from the generator 47. Unevaporated water in the casing 24 is pumped through line 55 by pump 56 for return to the water supply tank 51, the pump 56 being driven by a motor 57, through any suitable means such as a belt 58.

Moisture precipitated from the air being conditioned is collected in pans 59 and collected in a manifold 60 for passage through pipe 61 to the water supply tank 51. A pipe 62 communicates with the discharge pipe 20 of the compressor 19 and impresses the discharge pressure upon a high-low control 63. A pipe 64 provides communication between the suction line 44 of the compressor 19 and the high-low control 63. A pipe 64' provides communication between the compressor suction line 44 and the Sylphon bellows 65 of the modulated engine speed control device by which the tension of the governor spring 17 is modified in accordance with load requirements as will hereinafter be more fully pointed out. The choke 12 is operated by a solenoid 66. The valve 36 is operated by a solenoid 67. The unloader valve 46 is operated by a solenoid 68.

A starting motor 18 is adapted to operate from battery 8 and is controlled by a switch 69 which is operated by a solenoid 70. The commutator or control switch of the system is indicated generally by the reference numeral 71. It is provided with commutator bars 72 adapted to make contact with contact points 73 and 74, commutator bar 75 adapted to make contact with contact points 76 and 77, commutator bar 78 adapted to complete the circuit between contact points 79 and 80, commutator bar 81 adapted to complete a circuit between contact points 82 and 83, and commutator bar 84 adapted to complete a circuit between contact points 85 and 86. The control switch is adapted to be actuated in response to the operation of the engine. As shown in Figure 1, a cylinder 87 houses a piston 88. A piston is normally urged downwardly by a spring 89. A pipe 90 provides communication with the interior of the cylinder 87, above the piston 88 and the intake manifold 91 of the engine. The arrangement is such that, when the engine is operating, the reduced pressure existing in the manifold 91 communicated through line 90 above the piston 88 will permit atmospheric pressure to lift the piston moving the commutator or switch member upwardly to the position shown in Figure 2. It is to be understood that any suitable means for operating the switch or commutator member as a function of the operation of the engine may be employed. For example, referring now to Figure 8, the engine 1 drives a pneumatic pump 92 through any suitable means such as a belt 93. The pipe 90 may be placed in communication with the pump 92 through line 94 by means of a valve 95, it being understood that, in such case, the valve 96, which provides communication with the intake manifold 91 of the engine, is closed. The pump 92 of course may be a pressure pump in which case the pipe 90 will communicate below the piston 88 as will be readily understood by those skilled in the art.

Considering now the electrical circuits which are controlled by the control switch, I provide a control panel 97, located in the air space being conditioned. In the case of a vehicle, the panel 97 will be situated in full view of the vehicle operator. On the panel 97 is mounted a master pilot light 98, a starting pilot light 99 and a running pilot light 100. A thermostat 101 is also mounted upon the control panel as is a master switch 102, a unit switch 103, and an air circulating fan switch 104. A push button 105 is adapted to be operated manually to close the circuit through the choke solenoid 66. The engine assembly is usually located remote from the air space being conditioned. In order that the engine may be tested when desired, I provide an engine panel 106 on which I mount a choke switch 107 paralleling the push button 105, a starter testing switch 108 paralleling contact point 76, and a test operating switch 109 paralleling the thermostat 101, the master switch 102 and the unit switch 103.

One side of the battery 8 is connected by conductor 110 to conductor 111 and contact point 112 of the starting switch 69. The starting switch 69, when in closed position, electrically connects contact point 112 with contact point 113. Contact point 113 is connected to conductor 114 which leads to the starting motor 18. The circuit through the starting motor is completed through conductor 115 to ground 116, it being understood that the other side of the battery 8 is grounded at 119.

Conductor 111 is connected to conductor 120, by which conductor 121 is adapted to be connected to the battery through master switch 102, thermostat 101, unit switch 103. The conductor 120 is connected to lead 122 to which contact points 76, 79, and 85 of the control switch are connected. Conductor 123 is connected to conductor 120 before the thermostat 101 and to conductor 123 contact points 73 and 82 of the commutator switch are connected.

The electrical circuits involved can be most easily understood from a description of the operation of the assembly.

Referring now to Fig. 1, it will be noted that the master switch 102 and the unit switch 103, as well as the thermostat 101 are closed. The assembly has not been operating and the air space to be conditioned is warm. The master switch 102 has just been closed. When the device is not operating, the engine of course is not operating and the spring 89 will move the control switch or commutator to the position shown in Figure 1. The switch having been closed, current will flow from the battery 8 through conductor 110, through conductor 111, through conductor 120, through master switch 102, through conductor 124, through thermostat 101, through conductor 125, through unit switch 103, through conductor 121, through conductor 122 to contact point 76, through commutator bar 75 to contact point 77, through conductor 126, through thermostatic element 128, through conductor 129, through winding 70, through conductor 114, through the starting motor 18, through conductor 115, to ground 116, and thence to the other side of the battery. The winding 70 being energized, the armature 130 will lift to close switch 69. The starting motor 18 will then be placed across the battery 8 and current will flow through conductor 114, switch 69, conductor 114, through the motor 18, through conductor 115, ground 116, and thence to the other side of the battery, actuating the starting motor 18. Conductor 131 is connected to one side of the starting pilot light 99, the other side of which is connected by conductor 132 to ground 133. It will be obvious, also, that current will also flow through the starting pilot light 99. If the engine is cool and has not been operating, it may be desirable to choke the same. The operator may press push button switch 105, completing a circuit through conductor 111, conductor 120, conductor 124, thermostat 101, conductor 125, conductor 134, push button switch 105, conductor 135, through the solenoid 66, operating the choke 12.

Current also flows from conductor 122 through contact point 79, commutator bar 78, contact point 80, conductor 136, to the primary 7 of the ignition induction coil, thence through interrupter 9 to ground 137, back to the other side of the battery.

It will be obvious that ignition energy is supplied to the engine 1 and the engine is being turned over by the starting motor 18. The operator will operate the choke 105 manually, as desired. Should the engine fail to start for any reason, the thermostatic element 128 will become heated and will break the circuit through the solenoid 70, interrupting the circuit through the starting motor. The interrupter 128 is merely a cranking timer to prevent running down battery 8 or burning out the windings of the starting motor 18.

It will also be noted that, independently of the thermostat, current will flow through conductor 111, conductor 120, master switch 102, conductor 123, contact point 73, commutator bar 72, contact point 74, conductor 138, through the solenoid 68 of the unloader valve 46 to ground 139 and thence to the other side of the battery 8. As long as current is flowing through solenoid 68, the unloader valve 46 will be held in open position, insuring that the compressor 19 is unloaded. This enables the engine to start under no load conditions.

Figure 2:
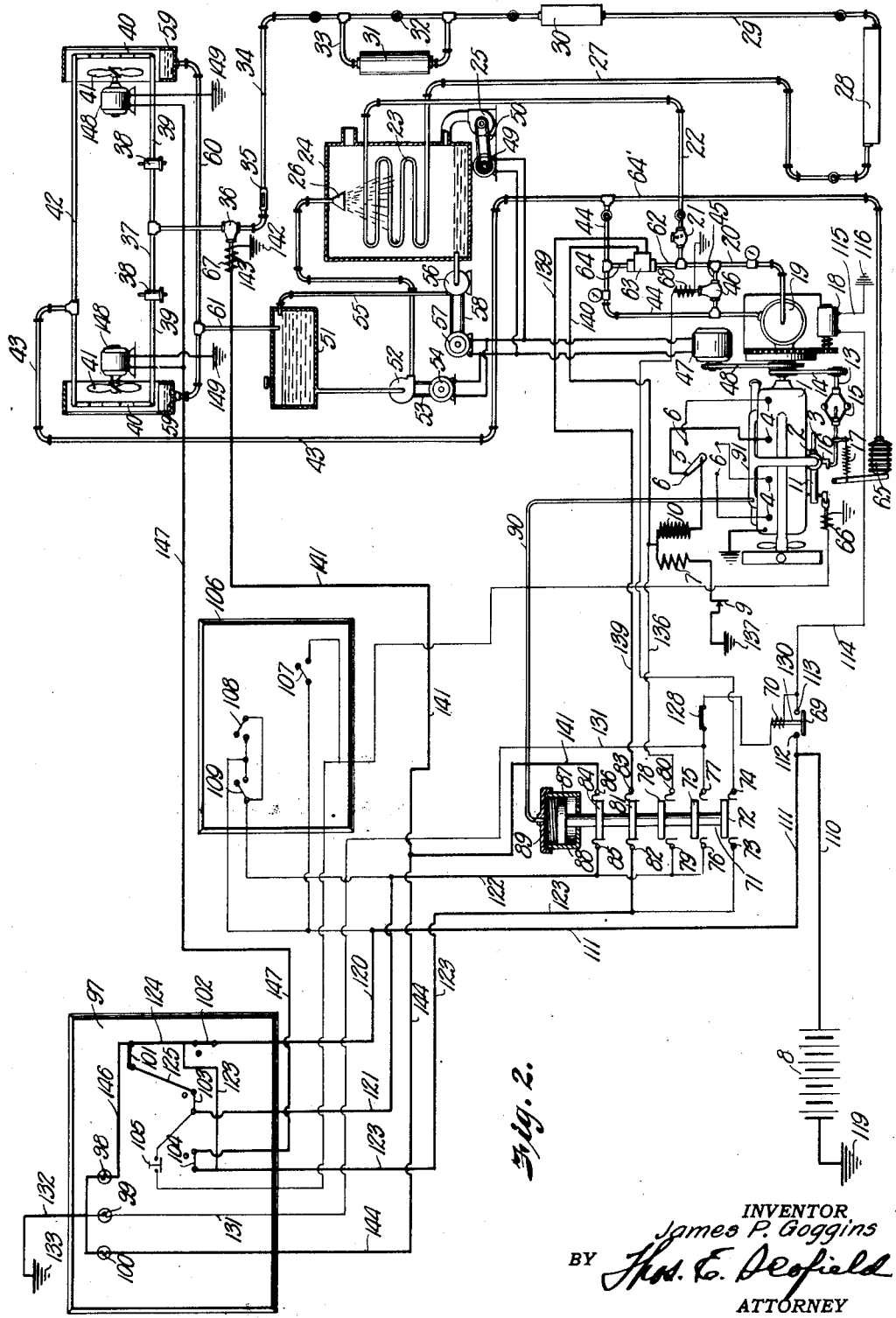
Figure 2 is a diagrammatic view similar to Figure 1, with the parts in running position.

As soon as the engine 1 has started, the reduction in pressure existing in the intake manifold 91 will be communicated through pipe 90 to the cylinder 87 of the control switch, permitting it to move to the position shown in Figure 2, to which reference will now be had. It will be noted that commutator bar 72 has moved away from contact points 73 and 74, thus breaking the circuit through the solenoid 68, and permitting the unloader valve 46 to seat, thus placing the compressor in operative condition. It will also be noted that commutator bar 75 has moved upwardly and broken the circuit across contact points 76 and 77, thus deenergizing the winding 70 of the starting switch 69, permitting the starting motor 18 to stop. It will also be noted that the commutator bar 78 has moved away from contact points 79 and 80, so that potential to the ignition coil is no longer supplied through conductor 136. It will be obvious, however, that commutator bar 81 has made contact between contact points 82 and 83, so that current is flowing through conductor 110, through conductor 111, through conductor 120, through master switch 102, through conductor 123, through contact point 82, through commutator bar 81, through contact point 83, through conductor 139, through high-low control 63, through conductor 140, to the primary 7 of the ignition induction coil, through the interrupter 9 to ground 137. The arrangement is such that commutator bar 81 makes contact with contact points 82 and 83 before commutator bar 78 breaks contact with contact points 79 and 80, the ignition being transferred by the upward movement of the master control switch through a circuit including the high-low control 63.

It will also be observed that commutator bar 84 has made contact with contact points 85 and 86, so that current will flow from the battery 8 through conductor 110, conductor 111, conductor 120, master switch 102, conductor 124, thermostat 101, conductor 125, unit switch 103, conductor 121, contact point 85, commutator bar 84, contact point 86, conductor 141, through the winding 67 to ground 142, and thence to the other side of the battery 8 through ground 119. Energization of the winding 67 actuates armature 143 to move valve 36 to open position, it being understood that the valve is normally urged to closed position by any suitable means. The interruption of the circuit between contact points 76 and 77 interrupts the circuit through starting pilot light 99. Winding 67 is paralleled by conductor 144 which is connected to the running pilot light 100, the circuit being completed through conductor 132 to ground 133. It will also be observed that whenever the master switch 102 is closed, the master pilot light 98 is connected to one side of the battery through conductors 124 and 146 so that pilot light 98 will be energized by the passage of current to the other side of the battery through conductor 132 and ground 133.

The engine 1 drives a compressor 19 which compresses the refrigerant fluid which passes through the cycle hereinabove described. The generator 47 will furnish current for the actuation of motors 57, 49, and 54, which operate the evaporative condenser. The switch 104 is closed, permitting current to flow from the battery through conductor 147 to supply the current to the motors 148, which operate the circulating air fans 41. It will be observed that the motors 148 are supplied current from the battery 8 so that, if desired, air may be circulated after the engine 1 has stopped.

After the system has been operating and the predetermined temperature to which the thermostat 101 is set has been reached, the thermostat will open the circuit through conductors 124, 125, 121, contact point 85, commutator bar 84, contact point 86, conductor 141, thus deenergizing the winding 67 and permitting the valve 36 to close. This circuit is the only one broken by the thermostat after the engine is running, it being observed that the ignition is supplied independently of the thermostat. As soon as valve 36 closes, the pressure in the discharge pipe 20 leading from the compressor 19 tends to build up. At the same time, the suction pipe 44 leading to the compressor becomes exhausted. The differential pressure existing between the suction and discharge, operates the high-low control shown in detail in Figure 6 and permits contact points 150 and 151 to separate, thus breaking the ignition circuit and stopping the motor. The evacuation of the suction line is an important feature. By locating check valve 21 in the discharge pipe 20 close to the compressor, only a small volume of high pressure gas need be distributed and I provide an evacuated low pressure side in which the comparatively small volume of high pressure gas may expand. This insures a substantially complete unloading of the compressor enabling ready starting of the engine when the thermostat again closes. As soon as the engine stops running, the master control switch or commutator will again assume the position shown in Figure 1, permitting the energization of the winding 68, moving the unloader valve to open position, permitting distribution of a comparatively small volume of high pressure gas through a well evacuated low pressure line. The starter circuit and the ignition circuit are both controlled by the thermostat so that when the engine stops in response to the opening of the thermostat 101, the compressor is immediately unloaded and the assembly stands ready to again operate whenever the thermostat closes. Since the engine has been warmed up by running, it will probably be unnecessary to use the choke push button.

The cranking pilot light 99 may be a red light and the running pilot light 100 may be a green light. If the starting or red light is extinguished before the green light turns on, the operator will know that the cranking limit switch 128 has opened. It may be manually reset or it may be of the type which will reset itself when it has cooled sufficiently.

The engine speed is governed by a governor 15 of any suitable construction, the arrangement being such that the spring 17 tends to open the throttle while the governor 15, acting against the spring 17, tends to close the throttle. The tension of the governor spring 17 will govern the speed at which the engine will operate. Under conditions of high load, the pressure existing in the suction pipe 44 is high. Under these conditions, it is desirous that the engine be permitted to run at a little higher speed to take care of the increased load. It will be observed that the suction line 44 communicates with the Sylphon bellows 65 through a pipe 64'. As the pressure in the suction line rises, the Sylphon bellows expands, moving the lever 152 to the left, increasing the tension of spring 17. The showing in Figures 1 and 2 is diagrammatic. As the load decreases, the pressure in the suction pipe 44 drops. Under these conditions, it is unnecessary that the engine run at the set speed, a slower speed being more preferable. This is automatically taken care of by a contraction of the bellows 65, permitting less tension on the governor spring 17, permitting the governor 15 to move the throttle 16 toward closed position.

Referring now to Figure 7 of the drawings, the engine modulation control just generally described is shown in detail. The governor housing is indicated by a reference numeral 153. The governor is run by the engine in any suitable manner and controls a shaft 154 to which a throttle lever 155 is keyed. The arrangement is such that, as the engine tends to exceed its set speed, the shaft 154 will rotate clockwise, moving the link 156 to the right as viewed in Figure 7, operating the throttle operating arm 157 to move the throttle to closed position, against the action of spring 17. One end of the spring 17 is secured to the lower end of the lever 155. The other end of spring 17 is secured to one leg of a bell crank lever 158 as can readily be seen by reference to Figure 7. A housing 159 encloses a Sylphon bellows 65. A spring 160 mounted within the housing urges the bellows to expanded position. A shaft 161 is mounted to move with the movement of the free end of the Sylphon bellows 65. The pipe 64' communicates with the suction side of the compressor. An increase in pressure in pipe 64', as would be occasioned by a heavy load, tends to compact the Sylphon bellows 65 against the action of spring 160, thus moving the rod 161 downwardly. Rod 161 is secured to the other leg of the bell crank lever 158. Downward movement of the rod 160 rotates the bell crank lever around its pivot 162 in a counter-clockwise direction, thus increasing the tension on spring 17 and tending to open the throttle against the action of the governor. Should the load become decreased, the suction pressure will drop, permitting the spring 160 to expand the Sylphon bellows, moving the rod 161 upwardly and rotating the bell crank lever 158 in a clockwise direction, decreasing the tension on spring 17 and permitting the throttle to move toward closed position under the action of the governor.

Referring now to Figure 6, which shows the high-low control Sylphon bellows 163 communicates with the discharge pipe 20 of the compressor through pipe 62. Sylphon bellows 164 communicates with the suction line of the compressor through pipe 64. Contact point 150 is carried by the free end of bellows 164. A contact point 151 is carried upon a lever 165, pivoted at 166. The other end of lever 165 is secured to the Sylphon bellows 163 and a drop in pressure in the suction line of the compressor will tend to contract bellows 164, moving contact point 150 upwardly, tending to break the ignition circuit through conductors 139 and 140. An increase in pressure in the discharge side of the compressor tends to expand Sylphon bellows 163, pivoting the lever 165, moving the contact point 151 downwardly away from contact point 150, tending to break the circuit. The pressure at which the circuit is broken is governed by the compression of spring 167 which is adjusted through adjusting knob 168. An increase in the spring tension 167 will tend to maintain contact points 150 and 151 in contact through a greater reduction in pressure on the suction side and a greater increase in pressure on the pressure side.

Referring now to Figures 3, 4, and 5, I have shown the construction of my master control switch or commutator. The upper portion of the assembly comprises a cylinder 87 in which is housed a spring 89 and a piston 88. A piston rod 169 extends into a block 170 of insulating material. The block 170 carries the various commutator bars 72, 75, 78, 81, and 84. The end of piston rod 170 is provided with an enlarged portion 172, adapted to contact the upper end of the block 170. It will be observed that there is considerable lost motion between the piston rod 169 and the switch block 170. This arrangement permits the engine to start properly and prevents operation of the switch block upon the first few revolutions of the engine. The arrangement insures that the engine will be properly running before the switch block is shifted from the position it occupies in Figure 1 to that which it occupies in Figure 2. The lower end of the switch block 170 is guided by dowel pins 173 and 174. In the drawings in Figure 3, the switch is shown in its lowermost position, that is, with commutator bars 72, 75 and 78 in circuit-making position. A housing 175 protects the assembly. The lower end of piston 88 is open to the atmosphere through a vent 176.

It will be observed that I have accomplished the objects of my invention. I have provided an air conditioning assembly powered by an internal combustion engine, automatically controlled by means of a thermostat. I have eliminated the use of clutches with the incident wear, weight and difficulties involved. My assembly is entirely automatic. The engine operates only when required. It is light in weight and compact. It is adapted to cool an automobile omnibus independently of the omnibus motor. The unloading arrangement insures that the engine be started and attain operating speed before the load is placed thereon. My unit is flexible and may be readily installed in such vehicles as motor omnibuses without materially increasing the weight of the bus and without reducing the space allotted to passengers. The engine and compressor assembly may be located at one point and, because of the generator and motor arrangement for operating the evaporative condenser, the condenser may be located at another point, thus enabling the employment of all available space, irrespective of its location.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an air conditioning assembly, an internal combustion engine having an ignition circuit, a refrigerant fluid compressor with a driving connection from said engine, said compressor having a refrigerant fluid discharge pipe and a refrigerant fluid suction pipe, a pipe providing communication between said discharge pipe and said suction pipe, a valve in said intercommunicating pipe, an electromagnet for actuating said valve, a shut-off valve in said discharge pipe, a second electromagnet for operating said shut-off valve, a starting motor for said internal combustion engine, a master control switch adapted to control a plurality of circuits, a thermostat, a source of potential, a circuit including said thermostat and said master switch for energizing said ignition circuit, a circuit including said master switch and said thermostat for energizing said starting motor, a circuit including said master switch for energizing said first electromagnet to hold said intercommunicating valve in open position, said three circuits being completed by said master switch when it occupies a first position, a second control switch, means responsive to a function of the operation of said compressor for operating said second control switch, a second ignition circuit including said master switch and said second control switch, a circuit including said master switch and said thermostat for energizing said second electromagnet to hold said shut-off valve in open position, said last named circuits being adapted to be completed by said master switch in a second position, and means responsive to a function of the operation of said internal combustion engine for moving said master switch from said first position to said second position, the construction of said master switch being such that said second ignition circuit is completed before said first ignition circuit is broken.

2. In an air conditioning assembly, an internal combustion engine having an ignition circuit, a refrigerant fluid compressor with a driving connection from said engine, said compressor having a refrigerant fluid discharge pipe and a refrigerant fluid suction pipe, a pipe providing communication between said discharge pipe and said suction pipe, a valve in said intercommunicating pipe, an electromagnet for actuating said valve, a starting motor for said internal combustion engine, a master control switch adapted to control a plurality of circuits, a thermostat, a source of potential, a circuit including said thermostat and said master switch for energizing said ignition circuit, a circuit including said master switch and said thermostat for energizing said starting motor, a circuit including said master switch for energizing said electromagnet to hold said intercommunicating valve in open position, and means responsive to a function of the operation of said internal combustion engine for actuating said master switch to open said starting motor and said intercommunicating valve operating circuits.

3. In an air conditioning assembly, a compressor having a discharge pipe for compressed refrigerant fluid and a suction pipe for expanded refrigerant fluid, an internal combustion engine drivingly connected to said compressor, an ignition circuit for said internal combustion engine, said ignition circuit including a switch, means responsive to a function of the operation of said compressor for controlling said switch, a valve in said discharge pipe, an electromagnet holding said valve in open position, said electromagnet having an operating circuit including a thermostat, the construction being such that said valve will be held in open position by said electromagnet, when the circuit is completed through the thermostat, whereby when said thermostat moves to open the circuit through said electromagnet said valve will close, altering the operation of said compressor to operate said switch to open said ignition circuit.

4. In an air conditioning assembly, a refrigerant fluid compressor, a discharge pipe for compressed refrigerant fluid, a suction pipe for supplying expanded refrigerant fluid to said compressor, a check valve in said discharge pipe, a shut-off valve in said discharge pipe, means for driving said compressor, means responsive to the closing of said shut-off valve for rendering said driving means inoperative, a pipe providing communication between said discharge pipe and said suction pipe, a valve in said intercommunicating pipe whereby, when said compressor is stopped, it may be unloaded by opening said intercommunicating pipe valve to permit the compressed refrigerant fluid between said check valve and said compressor to expand in the evacuated suction pipe between said shut-off valve and said compressor.

5. In an air conditioning assembly, a refrigerant fluid compressor, a discharge pipe for compressed refrigerant fluid, a suction pipe for supplying expanded refrigerant fluid to said compressor, a check valve in said discharge pipe, a shut-off valve in said discharge pipe, means for driving said compressor, means responsive to the closing of said shut-off valve for rendering said driving means inoperative, a pipe providing communication between said discharge pipe and said suction pipe, a valve in said intercommunicating pipe whereby, when said compressor is stopped, it may be unloaded by opening said intercommunicating pipe valve to permit the compressed refrigerant fluid between said check valve and said compressor to expand in the evacuated suction pipe between said shut-off valve and said compressor, and means responsive to the non-operation of said driving means for opening said intercommunicating pipe valve.

6. In an air conditioning assembly, a refrigerant fluid compressor, an internal combustion engine directly connected thereto for driving the same, a master control switch for controlling the starting and operation of said engine through a thermostat, said master control switch being adapted to be moved to different positions during the starting of the internal combustion engine and during operation thereof, and means responsive to a function of the operation of said engine for moving said master control switch.

7. In an air conditioning assembly, a fluid refrigerant compressor, an unloader valve for said compressor, an internal combustion engine directly connected to said compressor for driving the same, an electric starting motor for said internal combustion engine, a master control switch adapted to control said unloader valve and said starting motor, said master control switch comprising a commutator block, a cylinder, a piston, a piston rod for operating said commutator block, fluid pressure means responsive to a function of the operation of said engine for operating said piston to move said commutator block, the construction being such that after said engine has been started, said starting motor will be deenergized and said unloader valve will be closed by the movement of said master switch, thus permitting the engine to start under no load conditions.

JAMES P. GOGGINS.